US012801709B2

(12) United States Patent
Salamon

(10) Patent No.: US 12,801,709 B2
(45) Date of Patent: Nov. 17, 2026

(54) SECURITY BY SECRET TAP RHYTHM

(71) Applicant: Dell Products L.P., Round Rock, TX (US)

(72) Inventor: Victor Salamon, Edmonton (CA)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 18/733,456

(22) Filed: Jun. 4, 2024

(65) Prior Publication Data

US 2025/0371121 A1 Dec. 4, 2025

(51) Int. Cl.
*G06F 21/32* (2013.01)

(52) U.S. Cl.
CPC .................................... *G06F 21/32* (2013.01)

(58) Field of Classification Search
CPC ................................. G06F 21/32; G06F 21/36
See application file for complete search history.

(56) References Cited

U.S. PATENT DOCUMENTS 10,587,594 B1 * 3/2020 McClintock ............ H04L 63/08
2013/0326604 A1 * 12/2013 Hird ........................ G06F 21/36 726/7
2014/0331188 A1 * 11/2014 Sandstrom .......... G06F 3/04883 345/173
2015/0161369 A1 * 6/2015 Weksler .................. G06F 21/32 726/19
2015/0294096 A1 * 10/2015 Grigg ...................... H04L 63/08 726/5
2015/0363589 A1 * 12/2015 Sochman ............. G06F 3/0416 455/26.1
2019/0213306 A1 * 7/2019 Caselles .................. G06F 21/32
2023/0153416 A1 * 5/2023 Sanchez .................. G06F 21/36 726/9

* cited by examiner

*Primary Examiner* — Joseph L Greene
(74) *Attorney, Agent, or Firm* — Chamberlain, Hrdlicka, White, Williams & Aughtry; Aly Z. Dossa

(57) ABSTRACT

Techniques described herein relate to a method for performing user authentication. The method includes obtaining an authentication request from a user, wherein the authentication request comprises a tap rhythm generated by the user using an authentication device; in response to the obtaining: identifying a user entry of a user entry repository associated with the user, wherein the user entry comprises an authenticating tap rhythm associated with the user; comparing the tap rhythm with the authenticating tap rhythm; making a determination that the tap rhythm matches the authenticating tap rhythm; and in response to the determination: approving the authentication request.

12 Claims, 8 Drawing Sheets

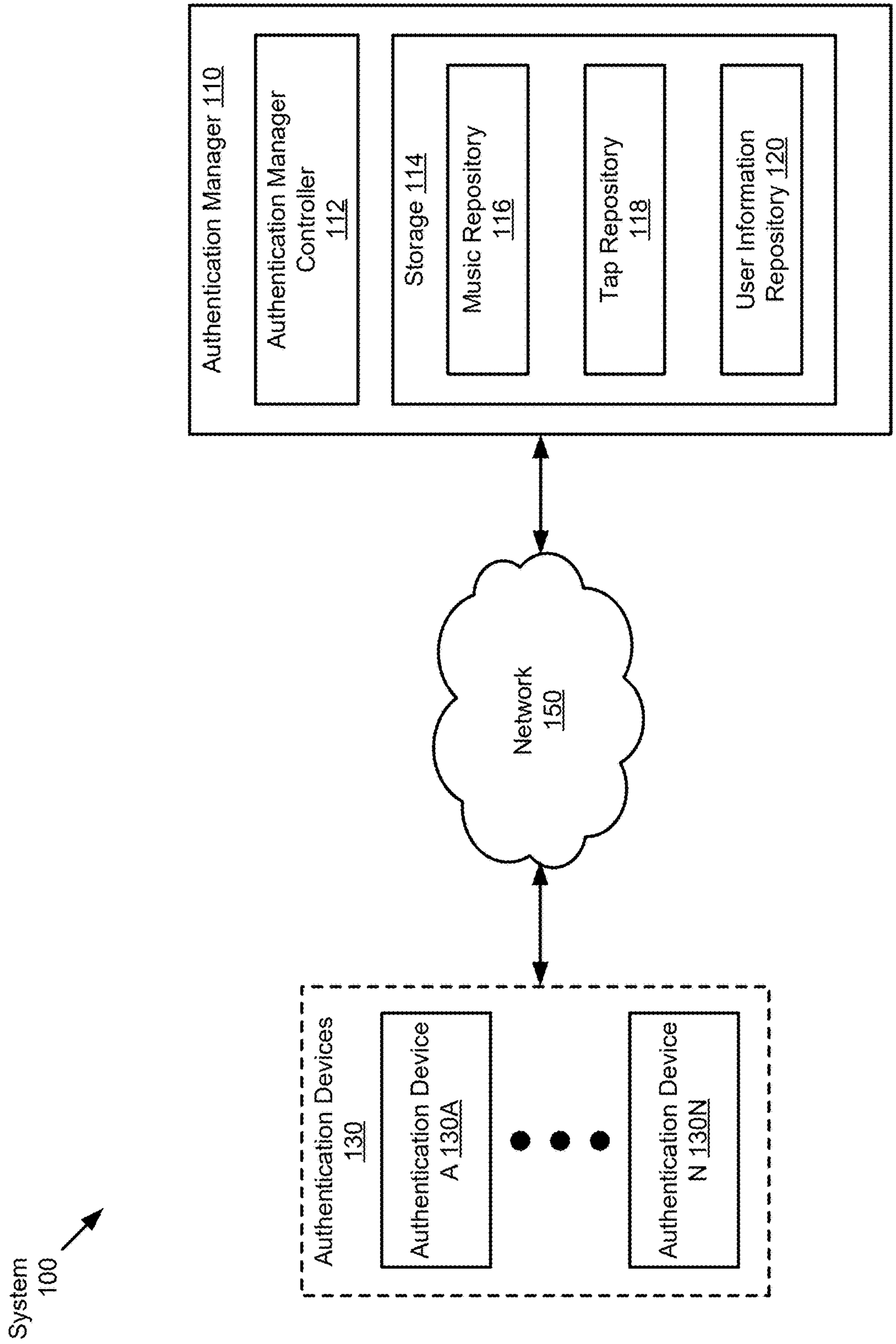
FIG. 1.1

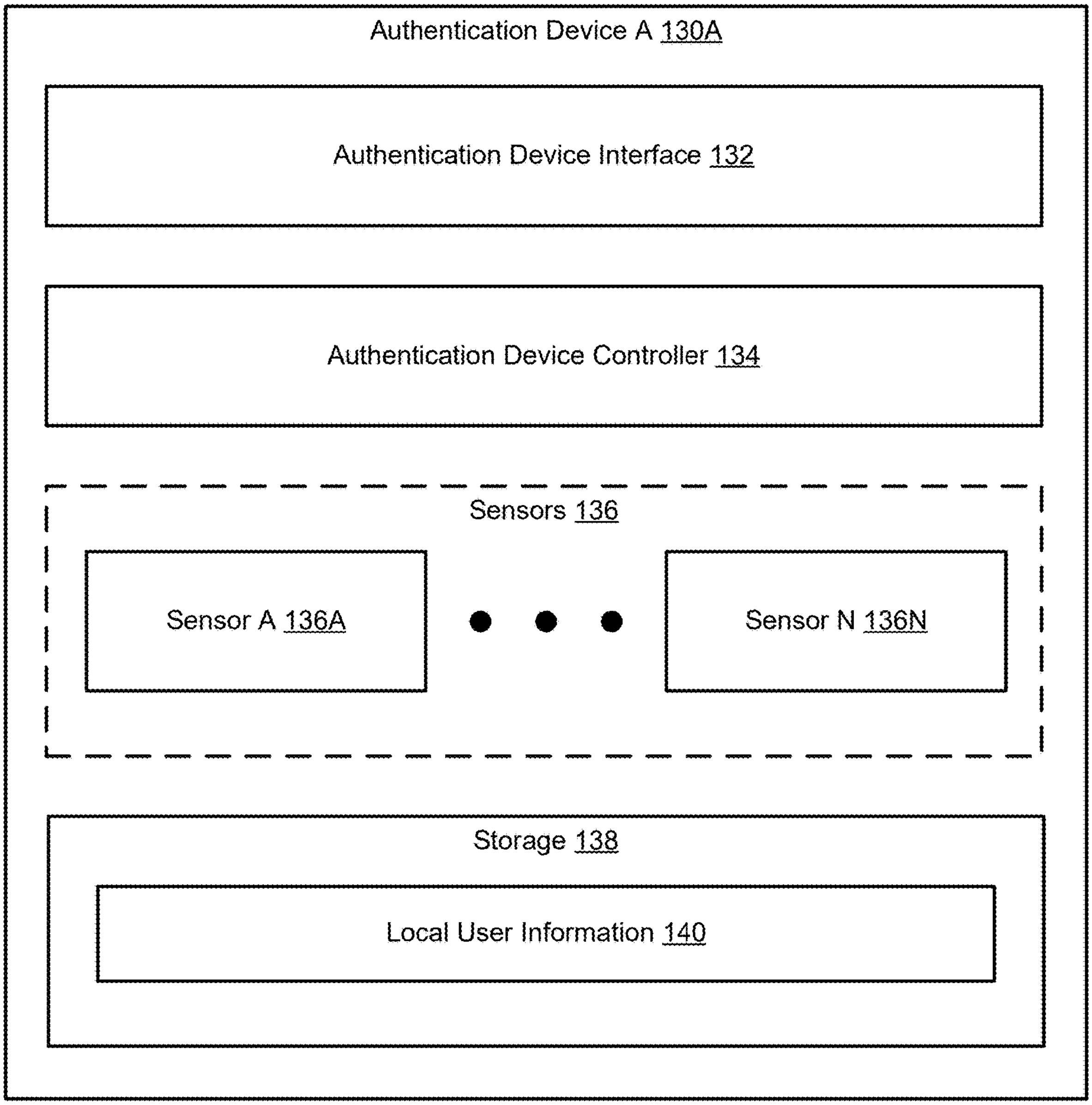
FIG. 1.2

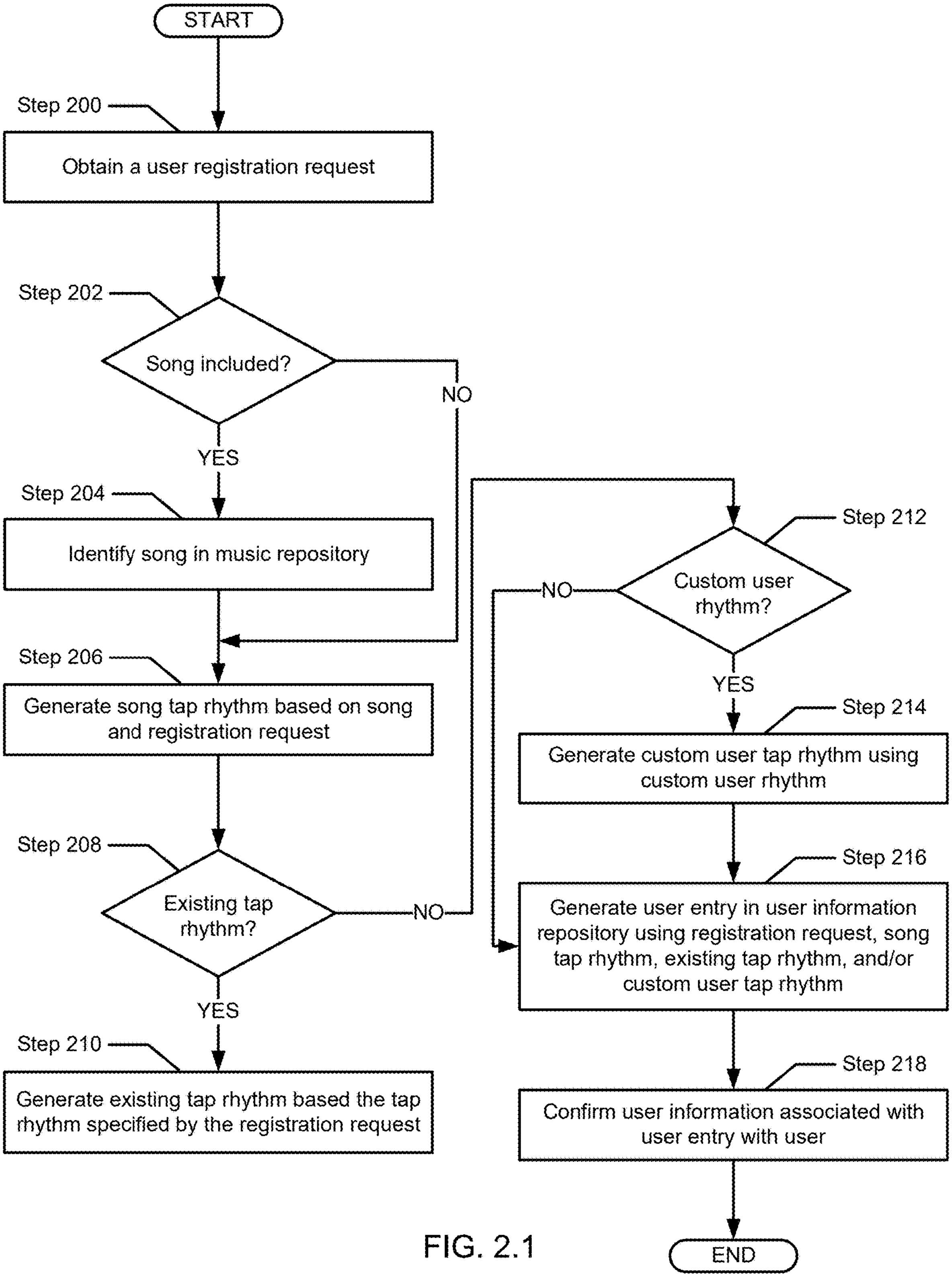
FIG. 2.1

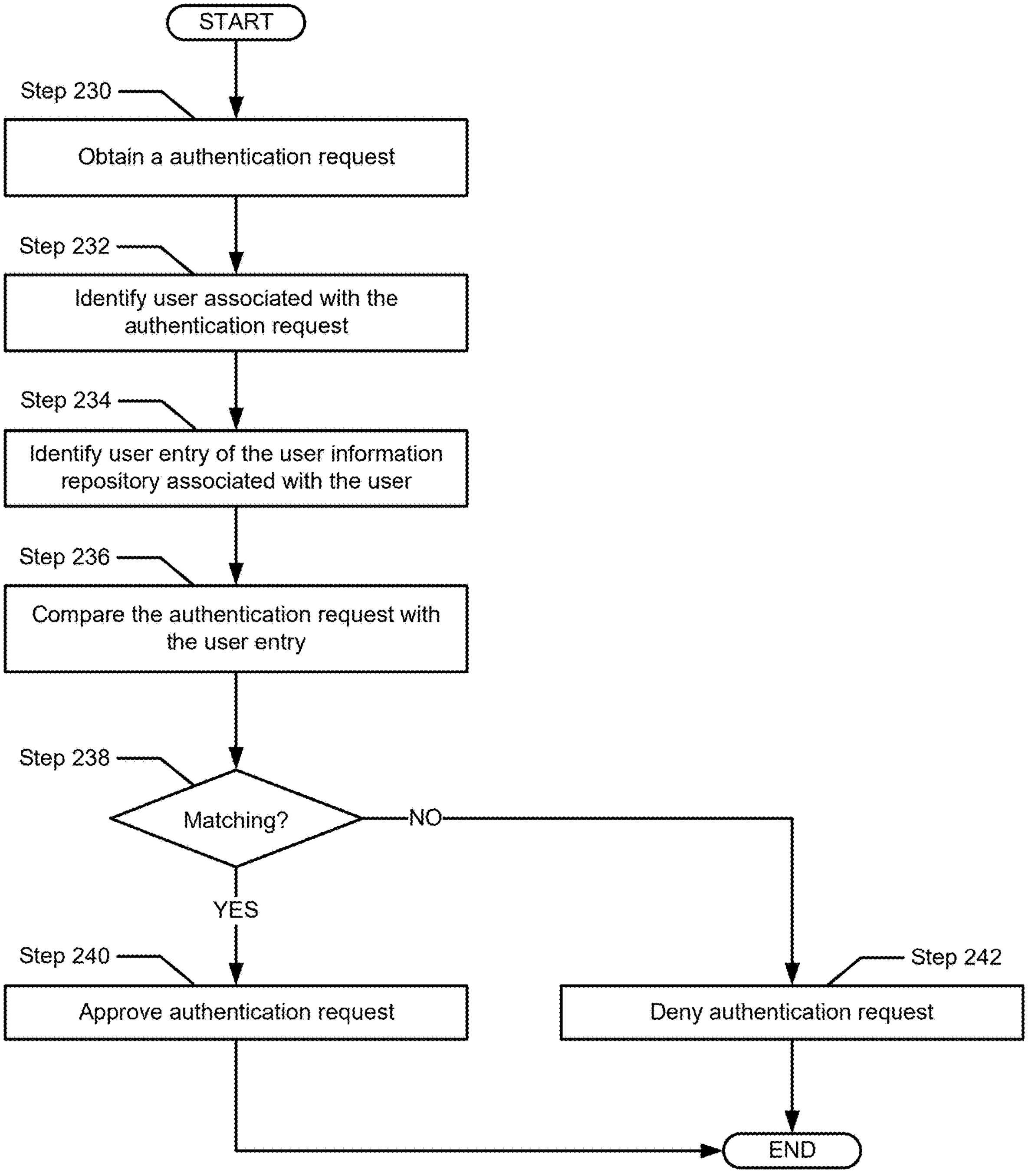
FIG. 2.2

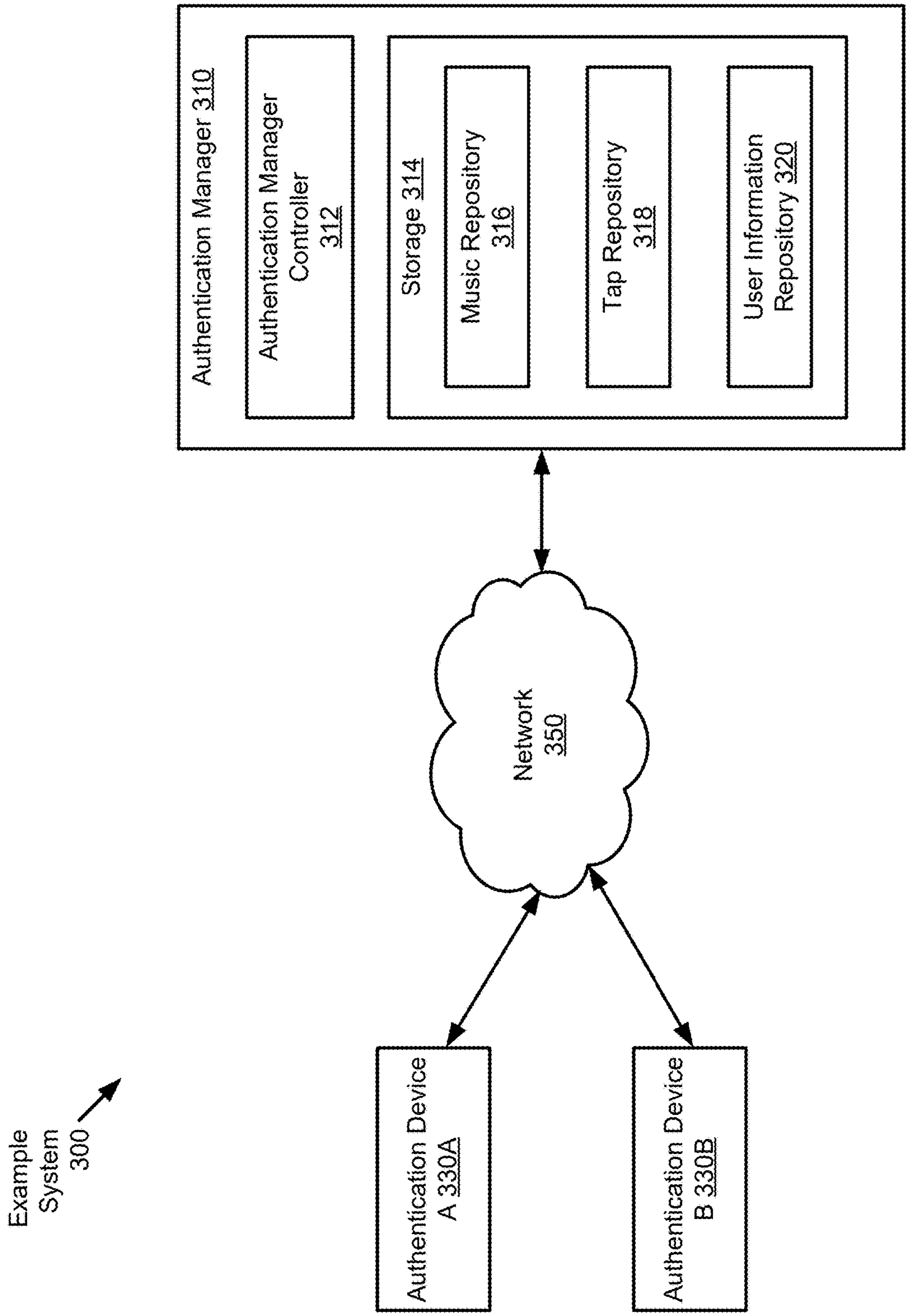
FIG. 3.1

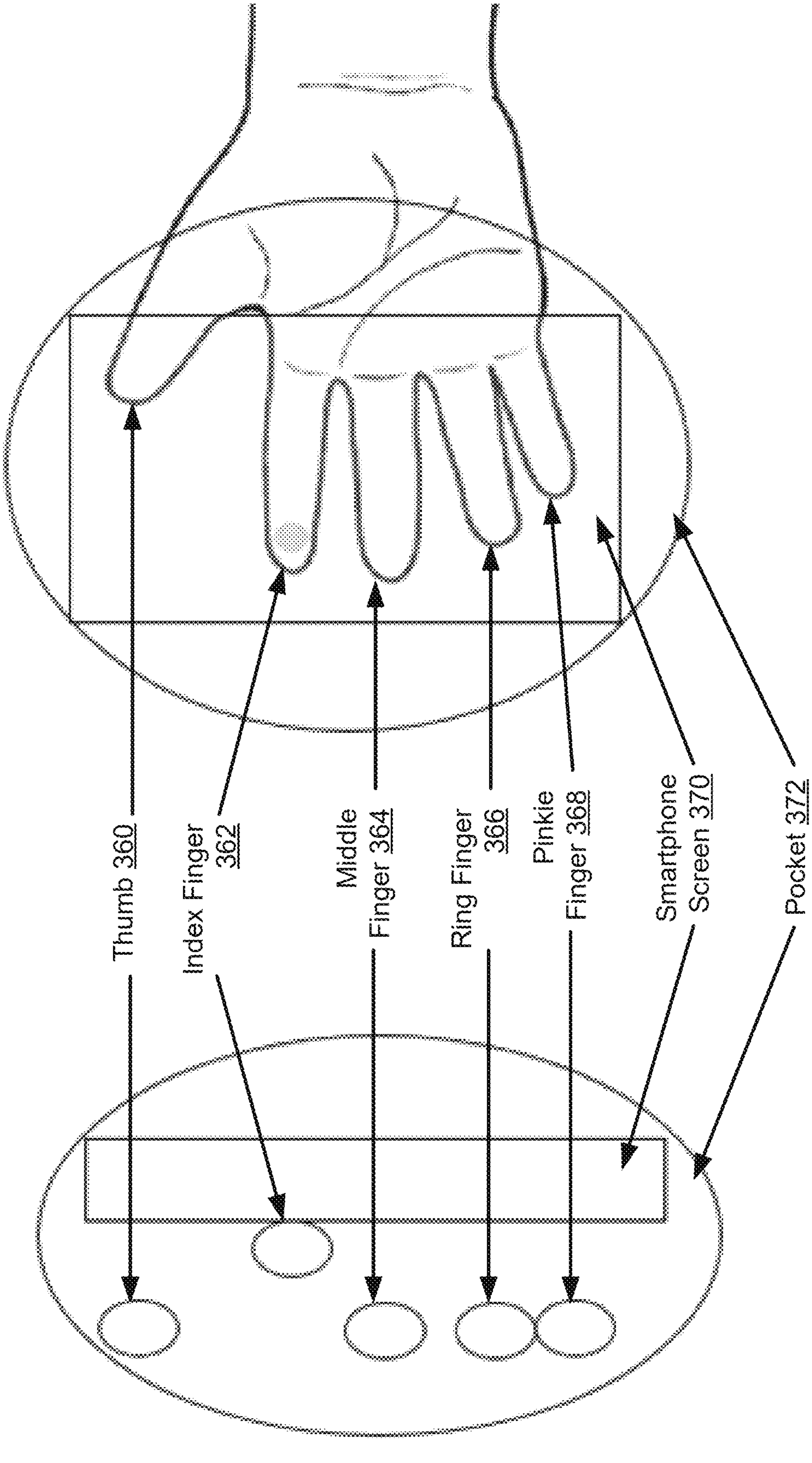
FIG. 3.2

Example Tap Rhythm 380

| Time slot | 1 | 2 | 3 | 4 | 5 | 6 | 7 | 8 | 9 |
|---|---|---|---|---|---|---|---|---|---|
| Tap or pause | Tap | Tap | Tap | Pause | Tap | Tap | Pause | Tap | Tap |

FIG. 3.3

Second Example Tap Rhythm 382

| Time slot | 1 | 2 | 3 | 4 | 5 | 6 | 7 | 8 | 9 |
|---|---|---|---|---|---|---|---|---|---|
| Track:Thumb | Tap | Tap | Tap | | | | | | |
| Track: Pointer | | | | | Tap | Tap | | | |
| Track: Middle | | | | | | | | Tap | Tap |
| Track: Ring | | | | | Tap | Tap | | | |
| Track: Pinkie | Tap | Tap | Tap | | | | | | |

FIG. 3.4

SECURITY BY SECRET TAP RHYTHM

BACKGROUND

Computing devices may provide services for users. To obtain the services, the users may perform user authentication to verify the identity of the user perform providing access to the computing devices by the user. User authentication may be performed to secure the computing devices and prevent unauthorized access to the computing devices. During user authentication, users may be required to provide information that may be used to verify the user's identity. After the user's identity is verified, the user may be granted access to the computing devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments disclosed herein.

FIG. 1.2 shows a diagram of an authentication device in accordance with one or more embodiments disclosed herein.

FIG. 2.1 shows a flowchart of a method for registering a user in accordance with one or more embodiments disclosed herein.

FIG. 2.2 shows a flowchart of a method for performing authentication in accordance with one or more embodiments disclosed herein.

FIGS. 3.1-3.4 show a diagram of examples in accordance with one or more embodiments disclosed herein.

DETAILED DESCRIPTION

Figure 4:
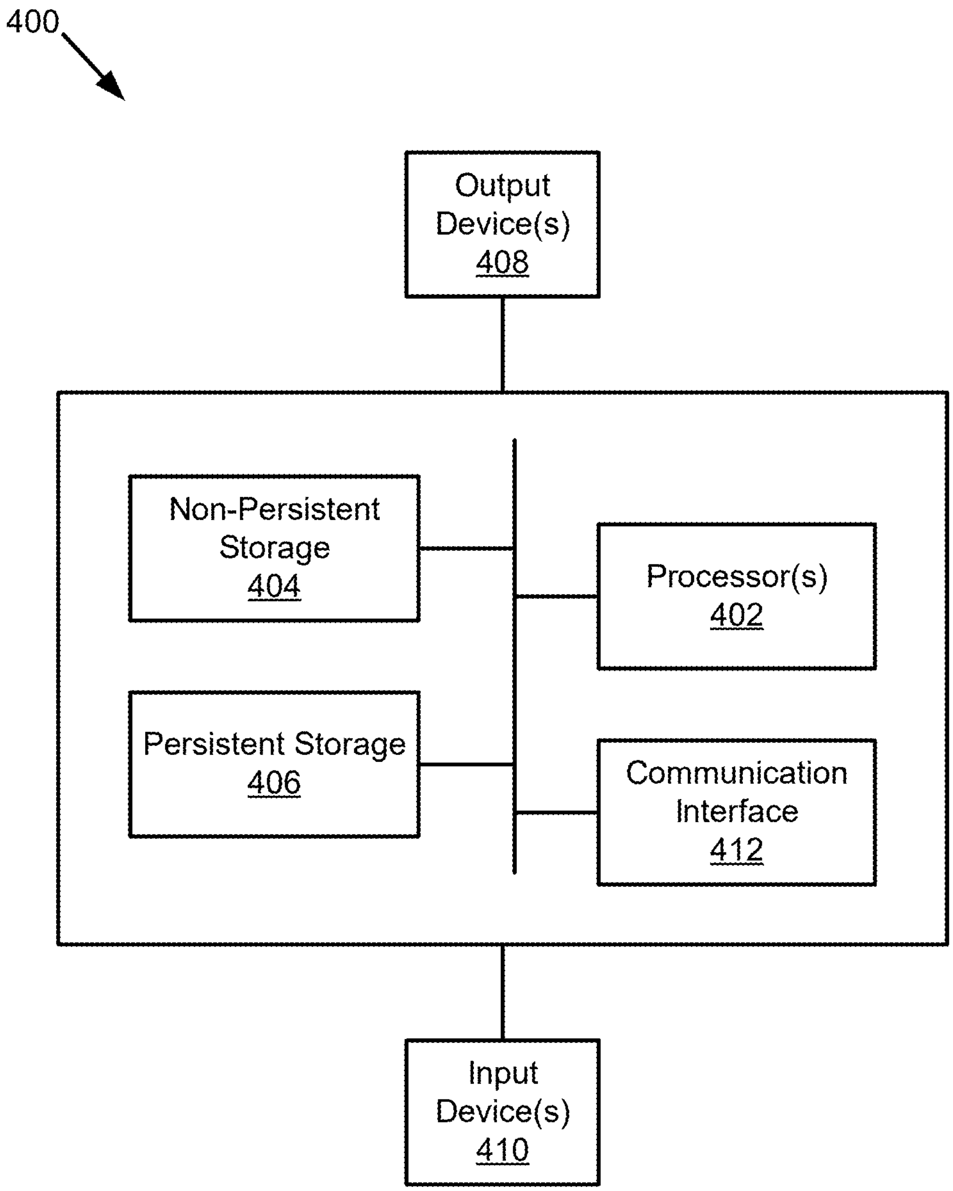
FIG. 4 shows a diagram of a computing device in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and non-transitory computer readable mediums for performing user authentication using tap rhythms.

User authentication may be performed to improve the security of computing devices, physical locations, automated teller machines (ATMs) or any other entity that a user may desire to be secured. One of the basic user authentication points is a physical terminal, such as the keypad on an ATM, or the keyboard on a computer or phone terminal. One of the basic attack vectors against terminal authentication is pin/password snooping (shoulder surfing). An attacker can remotely observe the key sequence a user types. For example an attacker may use sweeping observation or recordings such as through surveillance or security cameras mounted ubiquitously in shopping malls, stores, doorbell cameras, traffic cameras (mounted on rear view mirrors, stoplights, streetlamps, etc.), smartphones and camera-equipped smart eyeglasses. These cameras may record (and sometimes stream) all activities, without the express permission (or even knowledge) of the public. Furthermore, these recordings (and streams) are often insufficiently security protected.

An attacker may also use targeted observation or recording. For example, an attacker may observe and record what is being typed, using a high powered/long distance telescope. In both cases, short key sequences (e.g., such as at an ATM pin code) or long key sequences (e.g., a passphrase) may simply be observed or recorded for later playback and processing to prepare and implement an authentication attack.

To address, at least in part, the aforementioned issues discussed above, embodiments disclosed herein relate to systems, methods, and/or non-transitory computer readable mediums that enable secret tap rhythms to be used for user authentication. More specifically, embodiments disclosed herein may enable a user to set a secret tap rhythm as their user authentication or include the secret tap rhythm as part of the user's multi-factor authentication. Embodiments disclosed herein also enable a user to register one or more independent tap sequences. For example, in the simplest implementation, the user may use their entire hand, or a single finger, to register the following example sequence "tap-pause-tap-tap-pause-tap". Taps and pauses may be relative to each other. Each user may have their own sense of pace when tapping. The embodiments disclosed herein may take user specific timing into consideration when overlapping user taps against the tap repository. Embodiments disclosed herein do not simply relate to a tap sequence, but encodes a rhythm, similar to the rhythm of a song. Part of the tap rhythm code may include one or both of: (i) the length of pauses between taps (e.g., the count of user configurable time slots) and (ii) the length of each tap (e.g., the count of user configurable time slots while the user input is activated or touched). Embodiments disclosed herein may enable the user to user multiple user inputs (e.g., multiple fingers) to input a tap rhythm.

As a result, the security associated with user authentication may be improved. Embodiments disclosed herein enable the tap rhythm (hand/fingers+smartphone) to be provided inside of an area that blocks the view of the user inputs such as a protected pocket of clothing or a purse, protecting the tap rhythm from prying eyes or cameras that may be spying on the user's input. The benefits of tap rhythm security layer may come without having to invest in new specialized devices (e.g., existing smartphones may suffice). Embodiments disclosed herein may also provide an authentication method that is easier to remember than a password, passkey, or other sequence of characters. The tap rhythm disclosed herein may be as user friendly and easy to use as biometrics (e.g., finger print, face scan, etc.), without incurring the privacy and inflexibility concerns associated with using biometrics for authentication.

FIG. 1.1 shows a diagram a system in accordance with one or more embodiments disclosed herein. The system (100) may include an authentication manager (110), authentication devices (130), and a network (150). The components of the system illustrated in FIG. 1.1 may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1.1 is discussed below.

In one or more embodiments, the authentication manager (110) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the authentication manager (110) described herein and/or all, or a portion, of the methods illustrated in FIGS. 2.1-2.2. The authentication manager (110) may be implemented using other types of computing devices without departing from the embodiments disclosed herein. For additional details regarding computing devices, refer to FIG. 4.

The authentication manager (110) may be implemented using logical devices without departing from the embodiments disclosed herein. For example, the authentication manager (110) may include virtual machines that utilize computing resources of any number of physical computing devices to provide the functionality of the authentication manager (110). The authentication manager (110) may be implemented using other types of logical devices without departing from the embodiments disclosed herein.

In one or more embodiments, the authentication manager (110) may include the functionality to, or otherwise be programmed or configured to, perform authentication management services for authentication devices (130) and users pf the authentication devices (130). The authentication management services may include: (i) registering users of authentication devices for future authentications using tap rhythms, (ii) performing authentication verifications, (iii) and maintaining a music repository (116), a tap repository (118), and a user information repository (120). The authentication management services may include other and/or additional services without departing from embodiments disclosed herein. The authentication manager (110) may include other and/or additional functionalities without departing from embodiments disclosed herein. For additional information regarding the functionality of the authentication manager (110), refer to FIGS. 2.1-2.2.

As discussed above, the authentication manager (110) may include the functionality to perform authentication management services. To perform the aforementioned services, the authentication manager (110) may include an authentication manager controller (112) and storage (114). The authentication manager (110) may include other, fewer, or additional components without departing from embodiments disclosed herein. Each of the aforementioned components of the authentication manager is discussed below.

In one or more embodiments, the authentication manager controller (112) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the authentication manager controller (112) described throughout this Detailed Description.

In one or more embodiments disclosed herein, the authentication manager controller (112) may be implemented as computer instructions, e.g., computer code, stored on a storage (e.g., 114) that when executed by a processor of the authentication manager (110) causes the authentication manager (110) to provide the functionality of the authentication manager controller (112) described throughout this Detailed Description.

In one or more embodiments, the authentication manager controller (112) may include the functionality to perform authentication management services of the authentication manager (110). As discussed above, the authentication management services may include: (i) registering users of authentication devices for future authentications using tap rhythms, (ii) performing authentication verifications, (iii) and maintaining a music repository (116), a tap repository (118), and a user information repository (120). The authentication manager controller (112) may include other and/or additional functionalities without departing from embodiments disclosed herein. For additional information regarding the functionality of the authentication manager controller (112), refer to FIGS. 2.1-2.2.

In one or more embodiments, the storage (114) may be implemented using one or more volatile or non-volatile storages or any combination thereof. The storage (114) may include the functionality to, or otherwise be configured to, store and provide all, or portions, of information that may be used by the authentication manager controller (112) and/or other entities not shown in FIG. 1.1. The information stored in the storage (114) may include a music repository (116), a tap repository (118), and user information repository (120). The storage (114) may include other and/or additional information without departing from embodiments disclosed herein. Each of the aforementioned types of information is discussed below.

In one or more embodiments, the music repository (116) may include one or more data structures that include one or more song entries. The music repository (116) may include any quantity of song entries without departing from embodiments disclosed herein. A song entry of the song entries may include a song identifier, an artist identifier associated with the artist that released the song corresponding to the song entry, a release data specifying a point in time in which the song was released, a song length, at least a portion of an audio file that includes the song, and, if the audio file includes other songs, a song start time and a song end time associated with the audio file. The audio file may be any appropriate type of audio file (e.g., MP3, MP4, WAV, etc.) without departing from embodiments disclosed herein. The song entries may include other and/or additional information without departing from embodiments disclosed herein. The music repository (116) may be generated by a user (e.g., a system administrator) or obtained from a third party music library or music database. The authentication manager controller (112) may maintain the music repository (116) by adding, removing, or modifying song entries based on update requests from the user (e.g., system administrator) or to the third party music library or music database. The music repository (116) may be used by the authentication manager controller (112) to generate tap rhythms based on one or more songs chosen by users during user registration. The music repository (116) may include other and/or additional information and may be used for other and/or additional purposes without departing from embodiments disclosed herein.

In one or more embodiments, the tap repository (118) may include one or more data structures that include one or more tap entries. The tap repository (118) may include any quantity of tap entries associated with existing tap rhythms that a user may choose to use or include in the user's tap rhythm for user authentication. In one or more embodiments, a tap entry of the tap entries may include an existing tap rhythm and a corresponding tap rhythm identifier. The tap repository (118) may be generated and maintained by the authentication manager controller (112) using pre-built tap rhythms generated by a user (e.g., system administrator). The tap repository (118) may be used by the authentication manager controller (112) to generate tap rhythms based on one or more existing tap rhythms chosen by users during user registration. The tap repository (118) may include other and/or additional information and may be used for other and/or additional purposes without departing from embodiments disclosed herein.

As used herein, a tap rhythm may refer to a data structure that specifies a time-ordered sequence of presses or touches (e.g., user inputs made via sensor such as touching a touchscreen, pressing a button or key, etc.) (referred to herein as taps) and pauses (e.g., periods of non-inputs). The tap rhythm may include any combination of taps and pauses, each of any length of time, without departing from the embodiments disclosed herein. In one or more embodiment, the tap rhythm may further specify the start time and end time associated with each tap and pause in the tap rhythm. The start time may specify the time in the tap rhythm that the corresponding tap or pause begins. The end time may specify the time in the tap rhythm that the corresponding tap or pause ends. Additionally, for each tap, the tap rhythm may specify the sensor or specific type of user input that made, registered, and/or caused the tap. For example, the tap rhythm may specify that a first tap was made using a first user finger on a touchscreen, a second tap was made using a second user finger on the touchscreen, a third tap is made using a first button, etc. A tap rhythm may be generated via the methods discussed in FIG. 2.1. A tap rhythm may be used for user authentication via the methods discussed in FIG. 2.2. A tap rhythm may include other and/or additional information without departing from embodiments disclosed herein.

In one or more embodiments, the user information repository (120) may include one or more data structures that include one or more user entries. Each user entry may be associated with a user that has registered with the authentication manager (110) and to which the authentication manager (110) may provide user authentication services. A user entry of the user information repository (120) may include a user identifier associated with a corresponding user, and a tap rhythm (also referred to herein as an authentication tap rhythm or final authentication tap rhythm) used for authenticating the user during user authentication. The user entry may include other and/or additional forms of user authentication information for other and/or additional authentication techniques used during user authentication such as username and passwords, biometric information (e.g., user fingerprint, user face scan, user eye scan, etc.), passcode, pin code, etc. The user entry may further include an authentication device identifier and corresponding authentication device communication information (e.g., a network address, encryption keys, digital certificates, etc.) that may enable the authentication manager to communicate with the authentication device. The user entry may include other and/or additional information without departing from embodiments disclosed herein. The user information repository (120) may be generated and updated by the authentication manager controller (112) during user registration as discussed in FIG. 2.1. The user information repository (120) may be used by the authentication manager controller (112) to perform user authentication as is discussed in FIG. 2.2. The user information repository (120) may include other and/or additional information and may be used for other and/or additional purposes without departing from embodiments disclosed herein.

While the data structures (e.g., 116, 118, 120) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (114), any of the aforementioned data structures may be stored in different locations (e.g., in storage of other computing devices) and/or spanned across any number of computing devices without departing from embodiments disclosed herein. The data structures discussed in this Detailed Description may be implemented using, for example, files and file systems, lists, linked lists, tables, unstructured data, databases, etc.

Returning to the discussion of the system of FIG. 1.1, in one or more embodiments, the authentication devices (130) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the authentication devices (130) described herein and/or all, or a portion, of the methods illustrated in FIGS. 2.1-2.2. The authentication devices (130) may be implemented using other types of computing devices without departing from the embodiments disclosed herein. For additional details regarding computing devices, refer to FIG. 4.

The authentication devices (130) may be implemented using logical devices without departing from the embodiments disclosed herein. For example, the authentication devices (130) may include virtual machines that utilize computing resources of any number of physical computing devices to provide the functionality of the authentication devices (130). The authentication devices (130) may be implemented using other types of logical devices without departing from the embodiments disclosed herein.

In one or more embodiments, the authentication devices (130) may include the functionality to, or otherwise be programmed or configured to, perform local authentication services for users. The local authentication services may include: (i) obtaining user inputs during user authentication and user registration and (ii) providing user inputs to the authentication manager (110). The local authentication services may include other and/or additional services without departing from embodiments disclosed herein. The authentication devices (130) may include other and/or additional functionalities without departing from embodiments disclosed herein. The authentication devices (130) may include any quantity of authentication devices (e.g., 130A, 130N) without departing from embodiments disclosed herein. For example, the authentication devices (130) may include authentication device A (130A) and authentication device N (130N). For additional information regarding the authentication devices (130), refer to FIG. 1.2.

In one or more embodiments, the network (150) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the network (150) described herein and/or all, or a portion, of the methods illustrated in FIGS. 2.1-2.2. The network (150) may be implemented using other types of computing devices without departing from the embodiments disclosed herein. For additional details regarding computing devices, refer to FIG. 4.

The network (150) may be implemented using logical devices without departing from the embodiments disclosed herein. For example, the network (150) may include virtual machines that utilize computing resources of any number of physical computing devices to provide the functionality of the network (150). The network (150) may be implemented using other types of logical devices without departing from the embodiments disclosed herein.

In one or more embodiments, the network (150) may represent a (decentralized or distributed) computing network and/or fabric configured for computing resource and/or messages exchange among registered computing devices (e.g., the authentication devices (e.g., 130A, 130N) and the authentication manager (110)). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (150) may be implemented using any combination of wired and/or wireless network topologies, and the network may be operably connected to the Internet or other networks. Further, the network (150) may enable interactions between, for example, the authentication devices (e.g., 130A, 130N) and the authentication manager (110), and/or other entities not shown in FIG. 1.1 through any number and type of wired and/or wireless network protocols (e.g., TCP, UDP, IPv4, etc.).

The network (150) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (150) and its subcomponents may be implemented using hardware, software, or any combination thereof.

In one or more embodiments, before communicating data over the network (150), the data may first be broken into smaller batches (e.g., data packets) so that larger size data can be communicated efficiently. For this reason, the network-enabled subcomponents may break data into data packets. The network-enabled subcomponents may then route each data packet in the network (150) to distribute network traffic uniformly.

In one or more embodiments, the network-enabled subcomponents may decide how real-time (e.g., on the order of milliseconds or less) network traffic and non-real-time network traffic should be managed in the network (150). In one or more embodiments, the real-time network traffic may be high-priority (e.g., urgent, immediate, etc.) network traffic. For this reason, data packets of the real-time network traffic may need to be prioritized in the network (150). The real-time network traffic may include data packets related to, for example (but not limited to): videoconferencing, web browsing, voice over Internet Protocol (VOIP), etc.

As used herein, "communication" may refer to simple data passing, or may refer to two or more components coordinating a job. As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

Although the system of FIG. 1.1 is shown as having a certain number of components (e.g., 110, 112, 114, 130, 130A, 130N, 150), in other embodiments disclosed herein, the system may have more or fewer components. For example, the functionality of each component described above may be split across components or combined into a single component. Further still, each component may be utilized multiple times to carry out an iterative operation.

FIG. 1.2 shows a diagram of an authentication device in accordance with one or more embodiments disclosed herein. Authentication device A (130A) may be an embodiment of the authentication devices (130, FIG. 1.1) discussed above. As discussed above, authentication device A (130A) may include the functionality to local authentication services for users and the authentication manager (110, FIG. 1.1). To perform the aforementioned services, authentication device A (130A) may include an authentication device interface (132), an authentication device controller (134), sensors (136), and storage (138). Authentication device A (130A) may include other, additional, and/or fewer components without departing from embodiments disclosed herein. Each of the aforementioned components of authentication device A (130A) is discussed below.

In one or more embodiments disclosed herein, the authentication device interface (132) may represent an application programming interface (API) (e.g., a communication channel, an entry point to authentication device A (130A), etc.) for authentication device A (130A). To that extent, the authentication device interface (132) may employ a set of subroutine definitions, protocols, and/or hardware/software components for enabling communications between authentication device A (130A) and external entities (e.g., the authentication manager (110, FIG. 1.1), other authentication devices (e.g., 130N), etc.). One of ordinary skill will appreciate that the authentication device interface (132) may perform other functionalities without departing from the scope of the embodiments disclosed herein.

In one or more embodiments, the authentication device interface (132) may be implemented as one or more physical devices. A physical device may include circuitry. A physical device may be, for example, a field-programmable gate array, application specific integrated circuit, programmable processor, microcontroller, digital signal processor, or other hardware processor. The physical device may be configured to provide the functionality of the authentication device interface (132) described throughout this Detailed Description.

In one or more embodiments disclosed herein, the authentication device interface (132) may be implemented as computer instructions, e.g., computer code, stored on a storage (e.g., 138) that when executed by a processor of authentication device A (130A) causes authentication device A (130A) to provide the functionality of the authentication device interface (132) described throughout this Detailed Description.

In one or more embodiments, authentication device interface (132) may be implemented using any combination of hardware and software without departing from embodiments disclosed herein.

In one or more embodiments, the authentication device controller (134) may be configured to include the functionality to perform a portion of the local authentication services of authentication device A (130A). The portion of the local authentication services may include (i) obtaining user inputs from sensors (136) and converting the user inputs to tap rhythms during authentication and/or user information confirmation, (ii) obtaining user registration requests during user registration, (iii) providing tap rhythms and user registration requests to the authentication manager (110, FIG. 1.1), (iv) obtaining confirmation requests from the authentication manager (110, FIG. 1.1), and (v) obtaining authentication request approvals or rejections from the authentication manager (110, FIG. 1.1). The portion of the local authentication services performed by the authentication device controller (134) may include other and/or additional services without departing from embodiments disclosed herein. Authentication device controller (134) may include the functionality to perform all, or a portion of, the methods of FIGS. 2.1-2.2. The authentication device controller (134) may include other and/or additional functionalities without departing from embodiments disclosed herein.

In one or more embodiments disclosed herein, the authentication device controller (134) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the authentication device controller (134) described throughout this Detailed Description.

In one or more embodiments disclosed herein, the authentication device controller (134) may be implemented as computer instructions, e.g., computer code, stored on a storage (e.g., 138) that when executed by a processor of authentication device A (130A) causes the authentication device A (130A) to provide the functionality of the authentication device controller (134) described throughout this Detailed Description.

In one or more embodiments, the sensors (136) may include the functionality to obtain user inputs associated with tap rhythms during user authentication and user registration. Accordingly the sensors (136) may include any device or component capable of detecting touch, taps, presses or other physical user inputs and converting the inputs into an electrical signal without departing from embodiments disclosed herein. The sensors (136) may be implemented as any type of touchscreens, accelerometers, buttons, paddles, foot pedal, keys on a keypad, keys on a keyboard, and/or computer mice. The sensors (136) may be implemented using other and/or additional types of devices capable of detecting touch, taps, presses or other physical user inputs and converting the inputs into an electrical signal without departing from embodiments disclosed herein.

In one or more embodiments, the storage (138) may be implemented using one or more volatile or non-volatile storages or any combination thereof. The storage (138) may include the functionality to, or otherwise be configured to, store and provide all, or portions, of information that may be used by authentication device A (130A), the authentication device interface (132), the authentication device controller (134), and/or the sensors (136). The information stored in the storage (138) may include local user information (140). The storage (138) may include other and/or additional information without departing from embodiments disclosed herein.

In one or more embodiments, the local user information (140) may include one or more data structures that include one or more local user entries. A local user entry of the local user entries may include local user information associated with a corresponding user of authentication device A (130A). The user information may include a user identifier, user authentication information generated or provided by a user during user authentication and user registration (which may be provided to the authentication manager (110, FIG. 1.1)), and authentication manager communication information (e.g., a network address, encryption keys, digital certificates, etc.) which may enable authentication device A (130A) to communicate with the authentication manager (110, FIG. 1.1). The local user information (140) may be generated and maintained by the authentication device controller (134) using information obtained from the users. The authentication device controller (134) may delete user authentication information (e.g., tap rhythms, usernames and passwords, biometric information, etc.) after providing such information to the authentication manager (110, FIG. 1.1) to improve security of user authentication information and prevent unauthorized access of the user authentication information. The local user information (140) may include other and/or additional information and may be used by other and/or additional purposes without departing from embodiments disclosed herein.

FIG. 2.1 shows a flowchart of a method for registering a user in accordance with one or more embodiments disclosed herein. The method shown in FIG. 2.1 may be performed by, for example, an authentication manager (e.g., 110, FIG. 1.1). Other components of the system in FIGS. 1.1-1.2 may perform all, or a portion, of the method of FIG. 2.1 without departing from the scope of the embodiments described herein. While FIG. 2.1 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a user registration request is obtained. In one or more embodiments, the authentication manager may obtain the user registration request from an authentication device. The user registration request may include a user identifier corresponding to a user that initiated the user registration request on the authentication device. The user registration request may further include the authentication device identifier and communication information associated with the authentication device to enable further communication between the authentication manager and the authentication device. The request may be obtained from authentication device using any appropriate method of data transmission without departing from embodiments disclosed herein. For example, the request may be sent as one or more messages that include one or more network packets through one or more network devices that operatively connect the authentication manager to the authentication device. The user registration request may be obtained via other and/or additional methods without departing from embodiments disclosed herein.

In Step 202, a determination is made as to whether a song is included in the registration request. In one or more embodiments, the user registration request may further specify one or more songs to be included in the tap rhythm associated with the user. For each song, the request may include song information (e.g., song identifier, artist identifier, release date, etc.) and tap rhythm instructions. The user may include knowledge associated with the songs included in the music repository and generate the song information using the knowledge. The tap rhythm instructions may specify how the song is to be used to generate the tap rhythm. The tap rhythm instructions may specify an order of the songs to use to generate the tap rhythm, rhythm start and rhythm end times associated with each song to specify a portion of each song to include in the tap rhythm, etc. In one or more embodiments, the authentication manager may parse the user registration request to identify any song information. In one or more embodiments disclosed herein, if the user registration request includes song information, then the authentication manager may determine that a song is included in the user registration request. In one or more embodiments disclosed herein, if the user registration request does not include song information, then the authentication manager may determine that a song is not included in the user registration request. The determination as to whether a song is included in the user registration request may be made via other and/or additional methods without departing from embodiments disclosed herein.

In one or more embodiments, if it is determined that the user registration request includes a song title, then the method proceeds to Step 204. In one or more embodiments, if it is determined that the user registration request does not include a song title, then the method proceeds to Step 206.

In Step 204, a song is identified in the music repository. In one or more embodiments, the authentication manager may compare the song information with song entries included in the music repository. The authentication manager may identify a song entry of the music repository that includes song information that matches the song information included in the user registration request. The authentication manager may identify the song corresponding with the matching song entry as the identified song. The authentication manager may identify a song using the methods discussed above for each song included in the user registration request. A song may be identified in the music repository based on the user registration request via other and/or additional methods without departing from embodiments disclosed herein.

In Step 206, a song tap rhythm is generated based on the song and the registration request. In one or more embodiments, the authentication manager may generate a song tap rhythm for each song included in the user registration request. The authentication manager may generate the song tap rhythms based on the song instructions included in the registration request (e.g., based on an order of the songs to use to generate the song tap rhythm, rhythm start and rhythm end times associated with each song to specify a portion of each song to include in the tap rhythm, etc.). The authentication manager may use any appropriate technique to generate a song tap rhythm from the song without departing from embodiments disclosed herein. For example, the authentication manager may use beat detection algorithms, spectral analysis, musical information retrieval (MIR) algorithms, machine learning algorithms, etc. A song tap rhythm may be generated based on the song and the registration request via other and/or additional methods without departing from embodiments disclosed herein.

In Step 208, a determination is made as to whether the registration request specifies an existing tap rhythm. In one or more embodiments, the user registration request may further specify one or more existing tap rhythms included in the tap repository. For each existing tap rhythm, the request may include a tap rhythm identifier and tap rhythm instructions. The user may include knowledge associated with the existing tap rhythms included in the tap repository and generate the request, tap rhythm identifier, and tap rhythm instructions using the knowledge. The tap rhythm instructions may specify how the existing tap rhythm is to be used to generate the tap rhythm. The tap rhythm instructions may specify an order of the existing tap rhythms to use to generate the tap rhythm, rhythm start and rhythm end times associated with each existing tap rhythm in the request to specify a portion of each existing tap rhythm to include in the tap rhythm, etc. In one or more embodiments, the authentication manager may parse the user registration request to identify any existing tap rhythm identifiers. In one or more embodiments disclosed herein, if the user registration request includes an existing tap rhythm identifier, then the authentication manager may determine that existing tap rhythm is included in the user registration request. In one or more embodiments disclosed herein, if the user registration request does not include existing tap rhythm identifiers, then the authentication manager may determine that an existing tap rhythm is not included in the user registration request. The determination as to whether an existing tap rhythm is included in the user registration request may be made via other and/or additional methods without departing from embodiments disclosed herein.

In one or more embodiments, if it is determined that the registration request specifies an existing tap rhythm, then the method proceeds to Step 210. In one or more embodiments, if it is determined that the registration request does not specify an existing tap rhythm, then the method proceeds to Step 212.

In Step 210, an existing tap rhythm is generated based on the tap rhythm specified by the registration request. In one or more embodiments, the authentication manager may compare the existing tap rhythm identifiers included in the user registration request with tap entries included in the tap repository. The authentication manager may identify a tap entry of the tap repository that includes the existing tap rhythm identifiers that matches the existing tap rhythm identifiers included in the user registration request. The authentication manager may identify the existing tap rhythm corresponding with the matching tap entry as the identified existing tap rhythm. The authentication manager may identify an existing tap rhythm using the methods discussed above for each existing tap rhythm identifier included in the user registration request.

In one or more embodiments, the authentication manager may obtain the corresponding existing tap rhythms associated with the identified tap entries from the tap repository. The authentication manager may then generate the existing tap rhythm associated with the user registration request using the one or more obtained existing tap rhythms based on the tap rhythm instructions included in the user registration request (e.g., based on an order of the existing tap rhythms to use to generate the tap rhythm, rhythm start and rhythm end times associated with each existing tap rhythm in the request to specify a portion of each existing tap rhythm to include in the existing tap rhythm associated with the user registration request, etc.). The existing tap rhythm may be generated based on the tap rhythm specified by the registration request via other and/or additional methods without departing from embodiments disclosed herein.

In Step 212, a determination is made as to whether the registration request includes a custom user rhythm. In one or more embodiments, the user registration request may further include one or more custom user rhythms that the user generated for the user registration request. The custom user rhythm may include a tap rhythm not included in the tap repository or generated using a song from the music repository. The user registration request may further include tap rhythm instructions associated with the custom user rhythm (e.g., an order of the custom user tap rhythms). In one or more embodiments, the authentication manager may parse the user registration request to identify any custom user rhythms. In one or more embodiments disclosed herein, if the user registration request includes a custom user rhythms, then the authentication manager may determine that a custom user rhythm is included in the user registration request. In one or more embodiments disclosed herein, if the user registration request does not include a custom user rhythm, then the authentication manager may determine that a custom user rhythm is not included in the user registration request. The determination as to whether the registration request includes a custom user rhythm may be made via other and/or additional methods without departing from embodiments disclosed herein.

In one or more embodiments disclosed herein, if it is determined that the registration request includes a custom user rhythm, then the method proceeds to Step 214. In one or more embodiments disclosed herein, if it is determined that the registration request does not include a custom user rhythm, then the method proceeds to Step 216.

In Step 214, a custom user tap rhythm is generated using the custom user rhythm. In one or more embodiments, the authentication manager may obtain the one or more custom user rhythm included in the user registration request. The authentication manager may then generate the custom user tap rhythm associated with the user registration request using the one or more obtained custom user rhythms based on the tap rhythm instructions included in the user registration request (e.g., based on an order of the custom user rhythms to use to generate the custom user tap rhythm, rhythm start and rhythm end times associated with each custom user rhythm in the request to specify a portion of each custom user rhythm to include in the custom user tap rhythm associated with the user registration request, etc.). The custom user tap rhythm may be generated custom user rhythm specified by the registration request via other and/or additional methods without departing from embodiments disclosed herein.

In Step 216, a user entry in the user information repository is generated using the registration request, song tap rhythm, existing tap rhythm, and/or the custom user tap rhythm. In one or more embodiments, the authentication manager may generate a single authentication tap rhythm by combining the one or more song tap rhythms, the one or more existing tap rhythms, and/or the one or more custom user tap rhythms. The authentication manager may generate the authentication tap rhythm based on tap rhythm instructions for the final authentication tap rhythm. The tap rhythm instructions may specify an order in the final authentication tap rhythm of each of the generated song tap rhythms, the existing tap rhythms, and/or the custom user tap rhythms. The tap rhythm instructions may further specify the user input (e.g., button, finger, pedal, key, etc.) associated with each tap included in the final authentication tap rhythm. The authentication manager may then generate or update a user entry associated with the user corresponding with the user authentication request in the user information repository. The authentication manager may include the final authentication tap rhythm, the user identifier, the authentication device identifier, the authentication device communication information, and any other authentication information (e.g., username and password, biometric information, etc.) that may be used to perform user authentication for the user associated with the user entry. A user entry in the user information repository may be generated using the registration request, song tap rhythm, existing tap rhythm, and/or the custom user tap rhythm via other and/or additional methods without departing from embodiments disclosed herein.

In Step 218, the user information associated with the user entry is confirmed with the user. In one or more embodiments, the authentication manager may send a copy of the user information included in the user entry to the authentication device associated with the user. In response to obtaining the user information, the user may check the user information and send a confirmation response to the authentication manager. To check the user information, the user may attempt to enter the tap rhythm and determine if the entered tap rhythm (e.g., the tap rhythm the user expected to be generated) matches the final authentication tap rhythm. The confirmation response may indicate that the user confirms the user information or rejects the user information. If the confirmation response rejects the user information, the user may send another user registration request and Steps 200-218 may be repeated to correct the user information. The copy of the user information and the confirmation response may be transmitted using any appropriate method of data transmission without departing from embodiments disclosed herein. For example, the copy of the user information and the confirmation response may be sent as one or more messages that include one or more network packets through one or more network devices that operatively connect the authentication manager to the authentication device. The user information associated with the user entry may be confirmed with the user via other and/or additional methods without departing from embodiments disclosed herein.

In one or more embodiments disclosed herein, the method ends following Step 218.

FIG. 2.2 shows a flowchart of a method for performing authentication in accordance with one or more embodiments disclosed herein. The method shown in FIG. 2.1 may be performed by, for example, an authentication manager (e.g., 110, FIG. 1.1). Other components of the system in FIGS. 1.1-1.2 may perform all, or a portion, of the method of FIG. 2.1 without departing from the scope of the embodiments described herein. While FIG. 2.1 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 230, an authentication request is obtained. In one or more embodiments, the authentication manager may obtain the authentication request from an authentication device. The authentication request may include a user identifier corresponding to a user that initiated the authentication request on the authentication device. The authentication request may further include the authentication device identifier and communication information associated with the authentication device to enable further communication between the authentication manager and the authentication device. The authentication request may be obtained from authentication device using any appropriate method of data transmission without departing from embodiments disclosed herein. For example, the authentication request may be sent as one or more messages that include one or more network packets through one or more network devices that operatively connect the authentication manager to the authentication device. The authentication request may be obtained via other and/or additional methods without departing from embodiments disclosed herein.

In Step 232, a user associated with the authentication request is identified. As discussed above, the authentication request may include a user identifier associated with the user that generated the authentication request. The authentication manager may parse the authentication request to obtain the user identifier. The user associated with the user identifier may be identified as the user associated with the authentication request. The user associated with the authentication request may be identified via other and/or additional methods without departing from embodiments disclosed herein.

In Step 234, a user entry of the user information repository associated with the user is identified. In one or more embodiments, the authentication manager may compare the user identifier included in the authentication request and identified in Step 232 with the user identifiers included in the user entries of the user information repository. The authentication manager may identify the user entry of the user information repository associated with the user that includes the same user identifier as the one included in the authentication request. The user entry of the user information repository associated with the user may be identified via other and/or additional methods without departing from embodiments disclosed herein.

In Step 236, the authentication request is compared with the user entry. In one or more embodiments, the authentication manager may compare the authentication request and the user entry identified above. The authentication information included in the authentication request may be compared with the authentication information in the user entry. Accordingly, the tap rhythm entered by the user during authentication and included in the authentication request may be compared with the authentication tap rhythm included in the user entry associated with the user. Other and/or additional authentication information (e.g., username and passwords, pin codes, biometric information, etc.) included in the authentication request may be compared with corresponding authentication information included in the user entry. The authentication request may be compared with the user entry via other and/or additional methods without departing from embodiments disclosed herein.

In Step 238, a determination as to whether the authentication request and the user information included in the user entry is matching. In one or more embodiments disclosed herein, if the authentication information included in the authentication request matches the authentication information included in the user entry, then the authentication manager may determine that the authentication request and the user information included in the user entry are matching. In one or more embodiments disclosed herein, if the authentication information included in the authentication request does not match the authentication information included in the user entry, then the authentication manager may determine that the authentication request and the user information included in the user entry are not matching.

In one or more embodiments disclosed herein, if it is determined that the authentication request and the user information included in the user entry are matching, then the method proceeds to Step 240. In one or more embodiments disclosed herein, if it is determined that the authentication request and the user information included in the user entry are not matching, then the method proceeds to Step 242.

In Step 240, the authentication request is approved. In one or more embodiments, the authentication manager may send a message to the authentication device. The message may indicate that the authentication request is approved. Accordingly, the user may access the authentication device, data of the authentication device, and/or any other computing device and data therein operatively connected to the authentication device. The message may be provided to the authentication device using any appropriate technique of data transmission without departing from embodiments disclosed herein. For example, the message may be sent as one or more network packets through one or more network devices that operatively connect the authentication manager to the authentication device. The authentication request may be approved via other and/or additional methods without departing from embodiments disclosed herein.

In one or more embodiments disclosed herein, the method ends following Step 240.

In Step 242, the authentication request is denied. In one or more embodiments, the authentication manager may send a message to the authentication device. The message may indicate that the authentication request is denied. Accordingly, the user may not access the authentication device, data of the authentication device, and/or any other computing device and data therein operatively connected to the authentication device. The message may be provided to the authentication device using any appropriate technique of data transmission without departing from embodiments disclosed herein. For example, the message may be sent as one or more network packets through one or more network devices that operatively connect the authentication manager to the authentication device. The authentication request may be denied via other and/or additional methods without departing from embodiments disclosed herein.

In one or more embodiments disclosed herein, the method ends following Step 242.

To further clarify embodiments of the invention, a non-limiting example use case is provided in FIGS. 3.1-3.4.

Start of Example

The example use case, illustrated in FIGS. 3.1-3.4, is not intended to limit the scope of the embodiments disclosed herein and is independent from any other examples discussed in this application. FIGS. 3.1-3.4 illustrate an example of performing user authentication using tap rhythms.

Turning now to FIG. 3.1, FIG. 3.1 shows a diagram of an example system (300). For the sake of brevity, not all components involved in the example system may be discussed in FIG. 3.1.

The example system (300) includes an authentication manager (310), authentication device A (330A), and authentication device B (330B). The authentication manager (310) may be operatively connected to authentication device A (330A) and authentication device B (330B) via a network (350). The authentication manager (310) includes an authentication manager controller (312), and a storage (314). The storage (314) may include a music repository (316), a tap repository (318), and a user information repository (320).

At a first point in time, a first user using authentication device A (330A) sends a registration request to the authentication manager (310). The registration request includes an existing tap rhythm identifier associated with an existing tap rhythm included in the tap repository (318) that the user desires to use for user authentication. The registration request further includes a user identifier associated with the user. The authentication manager (310) then identifies the existing tap rhythm included in the tap repository (318) and use the tap rhythm to generate an authentication tap rhythm. The authentication tap rhythm includes the first example tap rhythm (380) shown in FIG. 3.3. The authentication manager (310) then generates a user entry in the user information repository (320) that include the authentication tap rhythm and the user identifier associated with the first user.

At a second point in time, the first user attempts to perform user authentication by inputting a tap rhythm on a button operatively connected to authentication device A (330A). Authentication device A (330A) then sends an authentication request including the tap rhythm inputted by the first user to the authentication manager (310). The authentication manager (310) compares the tap rhythm included in the authentication request with the authentication tap rhythm included in the user entry associated with the first user and determines that the tap rhythm included in the authentication request matches the authentication tap rhythm included in the user entry. In response to the determination, the authentication manager (310) approves the authentication request and sends a message to authentication device A (330A) indicating that the authentication request was approved. In response to obtaining the message, authentication device A (330A) grants access to the entity that the first user is trying to access by performing authentication.

At a third point in time, a second user using authentication device B (330B) sends a registration request to the authentication manager (310). The registration request includes a custom user rhythm generated by the second user that the second user desires to use for user authentication. The registration request further includes a user identifier associated with the second user. The authentication manager (310) generates an authentication tap rhythm using the custom user rhythm generated by the second user. The authentication manager (310) then generates a user entry in the user information repository (320) that include the authentication tap rhythm and the user identifier associated with the second user.

At a fourth point in time, the second user attempts to perform user authentication by inputting a tap rhythm on a touchscreen of authentication device B (330B). Authentication device B (330B) is implemented as a smartphone and the user enters the tap rhythm while authentication device B (330B) is in the user's jacket pocket. FIG. 3.2 shows a diagram of the second user entering the tap rhythm. The second user may input the tap rhythm by tapping on a smartphone screen (370) while the smartphone is in a pocket (372). The user may perform the taps using a thumb (360), an index finger (362) (also referred to as a pointer finger), a middle finger (364), a ring finger (366), and a pinkie finger (368). The tap rhythm is the second example tap rhythm (382) shown in FIG. 3.4.

Authentication device B (330B) then sends an authentication request including the tap rhythm inputted by the second user to the authentication manager (310). The authentication manager (310) compares the tap rhythm included in the authentication request with the authentication tap rhythm included in the user entry associated with the second user and determines that the tap rhythm included in the authentication request does not match the authentication tap rhythm included in the user entry because a tap was performed with the wrong finger. In response to the determination, the authentication manager (310) denies the authentication request and sends a message to authentication device B (330B) indicating that the authentication request was denied. In response to obtaining the message, authentication device B (330B) prevents access to the entity that the second user is trying to access by performing authentication.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

As used herein, an identifier associated with an entity may refer to a unique combination of alphanumeric characters that may be used to specify the entity from other entities of the same type. The identifier may include any combination of alphanumeric characters without departing from embodiments disclosed herein. The identifier may be global (known to all components of the system) or local (e.g., component specific such as a file identifier local to a computing device that is not known to other computing devices) without departing from embodiments disclosed herein.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for performing user authentication, comprising:

obtaining a registration request from a user, wherein the registration request specifies a tap rhythm;

making a first determination whether the registration request specifies an existing tap rhythm stored in a tap repository, wherein the tap repository stores tap rhythms that were designated, prior to obtaining the registration request, as unavailable for use as custom user rhythms and is accessed independently of any user identifier to determine eligibility of tap rhythms;

if the tap rhythm does not exist in the tap repository, making a second determination whether the registration request includes a custom user rhythm that is eligible for registration, wherein the custom user rhythm is eligible for registration if the custom user rhythm does not exist in any tap rhythm stored in the tap repository, wherein the custom user rhythm comprises a sequence of taps, pauses, and time periods associated with each tap and each pause in the sequence, wherein the taps are inputted by the user using a plurality of input sources on an authentication device, and wherein each of the plurality of input sources corresponds to a different finger of the user;

generating, responsive to the second determination that the custom user rhythm is eligible for registration, a user entry using the registration request and the custom user rhythm, wherein the user entry is stored only in a user information repository distinct from the tap repository, wherein the user information repository is used to associate eligible custom user rhythms with specific users via user entries, wherein the custom user rhythm is associated with the user via the user entry;

confirming the user entry with the user;

obtaining an authentication request from the user, wherein the authentication request comprises an authenticating tap rhythm generated by the user using a second authentication device;

in response to obtaining the authentication request:

identifying the user entry from the user information repository via comparing the custom user rhythm with the authenticating tap rhythm;

making a third determination that the custom user rhythm matches the authenticating tap rhythm; and in response to the third determination:

approving the authentication request.

2. The method of claim 1, wherein the user inputted the custom user rhythm to the authentication device using at least one sensor configured to measure the taps and the pauses.

3. The method of claim 1, wherein the custom user rhythm specifies which of the plurality of input sources delivers each tap on the authentication device.

4. The method of claim 3, wherein the custom user rhythm is configured to require at least two different input sources of the plurality of input sources to generate the custom user rhythm.

5. The method of claim 1, wherein generating the authenticating tap rhythm based on the registration request comprises:

making a fourth determination that the registration request comprises a song title associated with a song included in a song repository; and in response to the fourth determination:

generating a song tap rhythm based on the song, wherein the authenticating tap rhythm comprises the song tap rhythm.

6. The method of claim 1, wherein the method further comprises:

if the tap rhythm exists in the tap repository, generating the authenticating tap rhythm using the tap rhythm existing in the tap repository.

7. A non-transitory computer readable medium comprising computer readable program code, which when executed by a computer processor enables the computer processor to perform a method for performing user authentication, the method comprising:

obtaining a registration request from a user, wherein the registration request specifies a tap rhythm;

making a first determination whether the registration request specifies an existing tap rhythm stored in a tap repository, wherein the tap repository stores tap rhythms that were designated, prior to obtaining the registration request, as unavailable for use as custom user rhythms and is accessed independently of any user identifier to determine eligibility of tap rhythms, wherein the custom user rhythm comprises a sequence of taps, pauses, and time periods associated with each tap and each pause in the sequence, wherein the taps are inputted by the user using a plurality of input sources on an authentication device, and wherein each of the plurality of input sources corresponds to a different finger of the user;

if the tap rhythm does not exist in the tap repository, making a second determination whether the registration request includes a custom user rhythm that is eligible for registration, wherein the custom user rhythm is eligible for registration if the custom user rhythm does not exist in any tap rhythm stored in the tap repository;

generating, responsive to the second determination that the custom user rhythm is eligible for registration, a user entry using the registration request and the custom user rhythm, wherein the user entry is stored only in a user information repository distinct from the tap repository, wherein the user information repository is used to associate eligible custom user rhythms with specific users via user entries, wherein the custom user rhythm is associated with the user via the user entry;

confirming the user entry with the user;

obtaining an authentication request from the user, wherein the authentication request comprises an authenticating tap rhythm generated by the user using a second authentication device;

in response to obtaining the authentication request:

identifying the user entry from the user information repository via comparing the custom user rhythm with the authenticating tap rhythm;

making a third determination that the custom user rhythm matches the authenticating tap rhythm; and in response to the third determination:

approving the authentication request.

8. The non-transitory computer readable medium of claim 7, wherein the user inputted the custom user rhythm to the authentication device using at least one sensor configured to measure the taps and the pauses.

9. The non-transitory computer readable medium of claim 7, wherein the custom user rhythm specifies which of the plurality of input sources delivers each tap on the authentication device.

10. The non-transitory computer readable medium of claim 9, wherein the custom user rhythm is configured to require at least two different input sources of the plurality of input sources to generate the custom user rhythm.

11. The method of claim 3, wherein comparing the custom user rhythm with the authenticating tap rhythm comprises confirming that each tap of the authenticating tap rhythm is delivered using the same input source specified by the custom user rhythm.

12. The non-transitory computer readable medium of claim 9, wherein comparing the custom user rhythm with the authenticating tap rhythm comprises confirming that each tap of the authenticating tap rhythm is generated using the same input source specified by the custom user rhythm.

* * * * *